United States Patent Office 2,924,549
Patented Feb. 9, 1960

2,924,549

PAPER CONTAINING AN ORGANIC FLUORESCENT DYE

Caspar Klein, Leverkusen, and Ernst Podschus, Leverkusen-Bayerwerk, Germany, assignors to Farbenfabriken Bayer Aktiengesellschaft, Leverkusen, Germany, a corporation of Germany No Drawing. Application December 15, 1955
Serial No. 553,210

13 Claims. (Cl. 162—162)

This invention is directed to a novel pigment and a novel paper and to the method of making the same. In the preparation of paper, it is quite common to incorporate certain pigments in the paper in order to improve the opacity or whiteness of the paper. This is particularly true of paper used in newspapers and magazines.

Perhaps one of the best known pigments used for this purpose is titanium dioxide. This pigment is characterized by its whiteness and its ability to impart opacity and brightness to cellulosic papers. However, titanium dioxide is relatively expensive and it is advantageous to use pigments having a lower cost where possible.

According to this invention it has been found that paper which appears to the naked eye under daylight to be markedly whiter than papers pigmented with titanium dioxide have been produced. These papers have been obtained by incorporating therein certain finely divided, white, amorphous (noncrystalline), siliceous pigments in which the preponderant component is $SiO_2$ and an organic dye which fluoresces, emitting blue light, preferably emitting white or blue-white light.

Siliceous pigments which may be used in accordance with this invention are finely divided, white, amorphous, precipitated silica and silicates of aluminum in which the ratio of $SiO_2$ to alumina is in excess of 4, or various alkaline earth metal silicates which contain at least about two moles of $SiO_2$ per mole of alkaline earth metal oxide (CaO, MgO, BaO, etc.) therein. Such silicates include calcium silicate, magnesium silicate, sodium aluminum silicates, and the like. An especially advantageous paper is obtained by incorporating therein the siliceous reaction product between an aluminum salt, such as aluminum sulphate or aluminum chloride, in aqueous solution with a metal silicate having the composition $MO(SiO_2)_x$, where M is an alkaline earth metal or the aluminum content of a sodium aluminum silicate and $x$ is a number from 2 to 10 in the case of alkaline earth metal or 4 to 15 in the case of aluminum, including fractional numbers. This reaction may be conducted in situ in the paper pulp or may be effected prior to mixing the reactants with the paper pulp.

These siliceous pigments normally are prepared by a precipitation or like process and the silica or silicate is in an amorphous (noncrystalline) state. Normally, the average ultimate particles size of the silica or silicates herein contemplated should be less than about one micron, the best results being obtained with pigments having an average ultimate particle size of 0.015 to 0.5 micron, as determined by the electron microscope. Such pigments usually are in the form of flocs of these ultimate particles, and the flocs may range from 0.3 to 5 microns in size.

Alkaline earth metal silicates which may be used according to this invention may be prepared by reacting calcium chloride with sodium silicate, substantially as described in U.S. Patent No. 2,204,113. The sodium aluminum silicates may be prepared by digestion of kaolin with aqueous caustic soda or by reaction of sodium silicate with aluminum sulphate.

Typical products of this type have the following analyses:

TABLE I

| | Sample A | Sample B | Sample C |
|---|---|---|---|
| Loss at 105° C, percent | 11 | 4 | 5 |
| Loss on ignition, percent | 18 | 16 | 9 |
| Surface area (m.²/g.) | 188 | 76 | 129 |
| pH | 6.6 | 10.8 | 10.8 |
| Blue light reflectance (percent) | 95 | 97 | 96 |
| $SiO_2$ (percent) | 60.2 | 49.2 | 63.6 |
| $R_2O_3$ (percent) (largely $Al_2O_3$) | 13.0 | 10.4 | 12.0 |
| $Fe_2O_3$ (percent) | 0.24 | 0.21 | 0.34 |
| $Na_2O$ (percent) | 6.9 | 9.1 | 9.4 |
| CaO (percent) | <0.1 | 11.8 | 0.4 |
| MgO (percent) | <0.1 | 0.2 | 0.3 |

The luminescent material which is used according to this invention preferably is one which fluoresces blue light. Thus, this luminescent dye should, upon excitation, emit light by luminescence in the blue range of the visible spectrum, that is, substantially in the wave length range of 4,000 to 4,900 Angstroms. Preferably, it should also emit light in the other ranges of the visible spectrum and, for best purposes, materials or mixtures of materials are used which individually or collectively emit white or blue-white light. The fluorescence is caused by activation of the lumiscene material by short wave light, usually in the near ultraviolet range.

Organic dyes which fluoresce either as such or in dilute concentrations when mixed with other materials or solvents to emit blue, bluish green, and preferably white, light which may be used according to this invention include the following:

(1) Various sulfonic acids containing several 1,2,3-triazole rings, such as 4,4'-bis-[5'sulfonaphtho-1',2':4,5-triazolyl-(2)]-stilbene-2,2'-disulfonic acid, and like derivatives having the desired property and listed in U.S. Patent No. 2,668,777.

(2) Triazinyl compounds listed in U.S. Patent No. 2,694,064.

(3) Substituted dibenzothiophene dioxides disclosed in U.S. Patent No. 2,702,759.

(4) Triazole compounds disclosed in U.S. Patent No. 2,713,055.

(5) Dyes having the desired properties and listed in the following U.S. Patents: 2,341,009, 2,528,323, 2,528,324, 2,550,321, 2,590,485, 2,643,197, 2,658,064, 2,700,044, 2,715,630.

To the extent necessary to describe the present invention, disclosure of the above patents is incorporated herein by reference.

The paper herein contemplated may be produced according to this invention by mixing a paper pulp, such as ground wood, a sulphite pulp or kraft pulp or other pulp or mixtures thereof, with the silica pigment and the fluorescing agent in aqueous suspension.

In many cases the pH of the resulting pulp slurry is controlled so as to be on the acid side. This is done by adjusting the pH of the slurry with an aluminum salt, usually aluminum sulphate.

When calcium silicate or like alkaline earth metal silicate is introduced into a paper pulp suspension and the suspension is adjusted to a pH below 7, for example 5 to 7, by addition of alum, an especially advantageous result takes place. In this case the calcium silicate reacts with the alum or like aluminum salt with consequent production of an alumina-silica pigment and a calcium salt. The calcium salt (calcium sulphate or the like) usually precipitates with the alumina-silica but may be completely or partially dissolved in the water of the pulp slurry.

The alumina-silica pigment (which for convenience is referred to herein as an "aluminum silicate") produced by interaction of the metal silicate with the aluminum salt is a very effective opacifying agent.

The dye may be added with the silica pigment and during paper formation. Alternatively, the paper containing the pigment may be preformed and the sheet, before or after passing through the Fourdrinier, may be passed through a solution of the dye. Usually, the concentration of the dye is in the range of 0.01 to 5 grams of the dye per liter of solution. The amount of dye in the paper frequently is in the range of 0.001 to 1 percent by weight, based upon the weight of the paper, the exact amount depending largely upon the intensity and color of its irradiation. Enough dye is used in any event to improve the whiteness of the ultimate paper when viewed in daylight.

The amount of silicate pigment usually introduced into the paper usually ranges from about 1 to 10 percent by weight, based upon the dry weight of the cellulosic pulp used for the production of the paper. The amount of fluorescing agent which may be used depends of course upon the intensity of the light emitted by such agent.

The following example is illustrative:

Example I

In a series of tests, sheets of paper were prepared from an aqueous slurry of sulfite paper pulp containing approximately 5 grams of the sulfite pulp per liter of slurry. The pH of the slurry was in all cases maintained at 5.3. Two percent by weight of rosin size and 4 percent by weight of aluminum sulphate, both based upon the dry weight of the sulfite pulp in the slurry, were introduced into the slurry in each case. Any additional aluminum sulphate necessary to maintain the pH of the slurry at 5.3 was added.

In the first test, paper was prepared from this slurry without further addition agent. In the second test, 0.05 percent of sodium salt of bis [2-ethanolamino-4-amino-1,3,5-triazol(6)]-4.4'-diaminostilbene-2,3'-disulfonic acid, which is an agent which fluoresces white, based upon the weight of sulfite pulp, was introduced. In the third test, 0.05 percent of the above mentioned fluorescing agent and 3 percent by weight, based upon the dry weight of the sulfite pulp, of pigmentary titanium dioxide were introduced. In the fourth test, 0.05 percent by weight of the above mentioned fluorescing agent and 4.5 percent by weight (based upon the dry weight of the sulfite pulp) of calcium silicate having the approximate composition $CaO(SiO_2)_{3.3}$ were introduced. This calcium silicate had an average ultimate particle size between 0.05 to 1 micron and was prepared by reaction of sodium silicate with calcium chloride.

In each case the sheets of paper having a weight of 75 grams per square meter were prepared according to standard paper making techniques.

The following table shows the amount of light reflected by the respective paper samples, tested in 12 fold layer which corresponds to infinite thickness. The brightness was measured with the "Elrepho" means manufactured by Zeiss. The samples were irradiated by a xenon high pressure lamp using 7 wave length filters (Table II).

TABLE II

| Wave Length, Millimicrons | Paper from Basic Recipe | Pulp Recipe plus 0.05% Fluorescing Agent | Pulp Recipe plus 3% TiO₂ plus 0.05% Fluorescing Agent | Pulp Recipe 4.5% Calcium Silicate plus 0.05% Fluorescing Agent |
|---|---|---|---|---|
| 420 | 73.6 | 77.3 | 80.6 | 81.6 |
| 440 | 76.4 | 83.9 | 85.8 | 86.8 |
| 460 | 80.9 | 86.7 | 88.8 | 89.4 |
| 490 | 84.7 | 87.6 | 90.0 | 90.2 |
| 530 | 88.1 | 89.1 | 91.2 | 91.4 |
| 570 | 90.1 | 90.9 | 92.8 | 93.1 |
| 620 | 92.0 | 92.8 | 94.3 | 94.7 |

From the above table it will be apparent that the sample containing the titanium dioxide reflects substantially less of the blue light than does the sample containing the calcium silicate. As a consequence, paper prepared from the calcium silicate appears much more white under daylight or sunlight than does paper prepared from the titanium dioxide.

The above example illustrates a typical embodiment of the invention as applied to production of paper using sulfite pulp. Various other pulp mixtures may be treated in the same way. The following examples illustrate typical methods of preparing paper using calcium silicate. Practice of the present invention may be accomplished in each of such examples simply by adding 0.01 to 1 percent by weight, preferably about 0.05 percent by weight, of one of the fluorescent dyes mentioned above into the pulp slurries disclosed in the ensuing examples and continuing the practice as therein described.

Example II

A pulp beater is charged as follows:

|  | Grams |
|---|---|
| Unbleached sulfite pulp | 90 |
| Bleached kraft pulp | 180 |
| Hard white envelope cuttings | 90 |

This charge is dispersed in 23 liters of water and the resulting slurry is beaten in a Niagara beater for about 80 minutes to approximately 400 milliliters freeness, Canadian Standard (TAPPI Standard T227 m 50). One hundred milliliters of prepared rosin of about 5 percent by weight size is then added. Thereafter, 9 grams of pregelatinized starch is added and the pulp circulated in the beater long enough to ensure complete mixing. Aluminum sulphate in the amount of 3 percent by weight, based on the dry weight of pulp, is added as a solution containing 12.92 grams of aluminum sulphate octodecahydrate per liter. At this stage, the pulp consistency is approximately 1.1 percent. Stirring is continued for 2 minutes. Immediately thereafter, 4 percent by weight of calcium silicate having the composition $CaO(SiO_2)_{3.3}$ is added. The amounts are expressed as percentages of the dry weight of the pulp.

Stirring of the mixture is continued for 10 minutes more and the resulting stock is diluted to 8,000 milliliters, divided into ten 800-milliliter portions, and sheeted into paper.

Example III

A slurry containing about 11,000 gallons of water and 5 tons of dry pulverulent amorphous hydrated calcium silicate having the composition $CaO(SiO_2)_{3.3}$ plus about 12 percent by weight of bound water and about 4 percent by weight of free water, and having an average ultimate particle size of about 0.03 micron, is prepared. To this slurry is added 2000 gallons of a solution containing 140 pounds of a mannogalactin gum. This slurry is allowed to stand for about 18 hours. Thereafter the slurry is pumped to a mixing chest at rates which are periodically increased. During the first 30 minutes of the test, the flow rate is 600 pounds of calcium silicate per hour. It is then increased to 1200 pounds per hour. This rate is maintained for one hour, at the end of which the rate is raised to 1800 pounds per hour, and then to 2400 pounds per hour after an additional hour. Calcium silicate is fed at the latter rate for two additional hours, at which time the test is ended. The calcium silicate slurry is mixed in the mixing chest with an aqueous slurry of pulp consisting of 65 percent by weight bleached kraft Southern pine and 35 percent unbleached groundwood Southern pine on a virgin pulp basis, plus 15 percent by weight of broke, based on the weight of virgin pulp.

The water used to form these slurries has a pH of 7.7 and a calcium hardness of 39.3, and contains the following impurities in the amounts indicated:

| | Parts per million by weight |
|---|---|
| Sodium bicarbonate | 295 |
| Sodium chloride | 124 |
| Sodium sulphate | 12 |
| Calcium bicarbonate | 38 |
| Calcium sulphate | 10 |
| Magnesium bicarbonate | 5 |
| Magnesium sulphate | 2 |
| Magnesium chloride | 3 |
| Volatile and organic matter | 21.2 |

The pulp slurry flows at the rate of 5 tons of virgin pulp per hour, and has a consistency (percentage of virgin pulp by weight) of 3 percent by weight on leaving the mixing chest. The slurry of pulp and calcium silicate is pumped to a machine chest from which it is fed onto the wire of a Fourdrinier machine which is moving at the rate of 1100 feet per minute. Thus, on the average, the slurry is fed to the Fourdrinier machine within about 20 to 30 minutes after addition of calcium silicate to the cellulosic fiber. The paper web is pressed, dried, and calendered.

*Example IV*

A pulp slurry containing about 3 percent pulp by weight is prepared by adding kraft process Southern pine pulp and mechanically ground Northern spruce pulp to a tank equipped with an agitator at a rate of 300 pounds of pulp (dry basis) per hour. About 50 percent of the total weight of pulp is kraft pulp. The slurry is pumped to a stock chest and thence to a mixing chest where it is diluted to a consistency of about one percent pulp by weight and mixed with an aqueous slurry of calcium silicate.

The slurry of calcium silicate which is added to the beater is prepared by adding dry, finely divided amorphous calcium silicate to water in a mixing vessel equipped with an agitator to form a slurry containing 0.5 pound of calcium silicate per gallon of water. The calcium silicate has an average ultimate particle size of about 0.3 micron, and contains approximately 18 percent by weight CaO, 66 percent $SiO_2$, 4 percent free water, and 12 percent bound water by weight. This corresponds to a ratio of 3.3 moles of $SiO_2$ per mole of CaO.

The calcium silicate suspension is fed to the mixing chest at different rates which are increased as the run progresses. At the outset, the suspension is pumped to the mixing chest at the rate of 48 gallons per hour, is thereafter raised to 90 gallons per hour, and then to 180 gallons per hour. These amounts correspond to 24, 45, and 90 pounds of calcium silicate per hour respectively, or 8, 15, and 30 percent by weight of calcium silicate, based on the dry weight of fibers.

After mixing of the slurries of pulp and calcium silicate, the slurry containing both ingredients is pumped to a head box from which it flows on to the wire of a Fourdrinier machine 55 inches in width. Approximately 5 minutes on the average elapses from the time the calcium silicate is mixed with the pulp slurry until paper is formed. The water drawn through the wire is continuously recirculated. Some pigment is washed out in the water drawn through the wire so that the ratio of ash to wood fibers in the finished paper is slightly less than the ratio of pigment to pulp in the slurry coming on to the Fourdrinier machine.

In the practice of the above examples, it will be noted that in many cases the acidity of the pulp slurry is controlled by addition of aluminum sulphate or like water soluble acidic aluminum salt, for example aluminum chloride. In such a case the aluminum sulphate or like salt reacts with the calcium silicate precipitating alumina and thereby producing an alumina-silica pigment together with a calcium or like alkaline earth metal salt.

The alumina-silica pigment thus dispersed in the paper is an especially good opacifying pigment superior in many cases to the calcium silicate introduced.

It will be understood that any of the above mentioned amorphous siliceous pigments may be used in lieu of the calcium silicate mentioned in the above examples.

According to a further embodiment, the calcium silicate or like siliceous amorphous pigment may be mixed with or coated with the fluorescent dye. This may be accomplished in the case of a dye by forming a solution of the dye in a suitable solvent and spraying the solution onto the siliceous pigment. Because of the highly adsorptive character of the siliceous pigments, which normally have a surface area in the range of 25 to 300 square meters per gram, the dye solution is readily adsorbed by the pigment.

Although the present invention has been described with reference to the specific details of certain embodiments, it is not intended that such embodiments shall be regarded as limitations upon the scope of the invention except insofar as included in the accompanying claims.

We claim:

1. A composition which comprises a finely divided white, precipitated, amorphous, siliceous pigment of the group consisting of silica and silicates of metals of the group consisting of aluminum and alkaline earth metals containing at least two moles of $SiO_2$ per mole of metal oxide in which $SiO_2$ is the preponderant component, having an average ultimate particle size of 0.015 to 0.5 micron, and a small amount of an organic dye which fluoresces blue light, the collective light emitted by said dye being blue-white to white.

2. A composition which comprises a finely divided white, precipitated, amorphous, siliceous pigment of the group consisting of silica and silicates of metals of the group consisting of aluminum and alkaline earth metals containing at least two moles of $SiO_2$ per mole of metal oxide in which $SiO_2$ is the preponderant component, having an average ultimate particle size below one micron, and a small amount of an organic dye which fluoresces blue light, the collective light emitted by said dye being blue-white to white.

3. Paper containing at least about 1 percent by weight of a finely divided white, precipitated, amorphous, siliceous pigment of the group consisting of silica and metal silicates containing at least two moles of $SiO_2$ per mole of metal oxide in which $SiO_2$ is the preponderant component, having an average ultimate particle size of 0.015 to 0.5 micron, and a small amount greater than 0.001 percent of an agent which fluoresces blue light, the collective light emitted by said agent being blue-white to white.

4. Paper containing at least about 1 percent by weight of a finely divided white, precipitated, amorphous, siliceous pigment of the group consisting of silica and silicates of metals of the group consisting of aluminum and alkaline earth metals containing at least two moles of $SiO_2$ per mole of metal oxide in which $SiO_2$ is the preponderant component, having an average ultimate particle size below one micron, and a small amount of an organic dye which fluoresces blue light, the collective light emitted by said dye being blue-white to white.

5. Paper containing at least about 1 percent by weight of the reaction product of a water soluble acidic aluminum salt with an amorphous, precipitated, finely divided white, alkaline earth metal silicate having the composition $MO(SiO_2)_x$ where $x$ is 2 to 10 and M is an alkaline earth metal, said reaction product containing $SiO_2$ and $Al_2O_3$ in the proportions of at least about 4 to 1 respectively, and said silicate having an average ultimate particle size of 0.015 to 0.5 micron, and a small amount of an organic dye which fluoresces blue light, the collective light emitted by said dye being blue-white to white.

6. The paper of claim 5 wherein the alkaline earth metal is calcium.

7. Paper containing a small amount of an organic dye which fluoresces blue light, the collective light emitted by said dye being blue-white to white, and at least about 1 percent by weight of the reaction product of a water soluble acidic aluminum salt with an amorphous, finely divded, precipitated, white, sodium aluminum silicate pigment containing at least four moles of $SiO_2$ per mole of alumina, $SiO_2$ being the preponderant component of said pigment, said pigment having an average ultimate particle size of 0.015 to 0.5 micron.

8. The paper of claim 3 wherein the pigment is in the form of flocs of the ultimate particles thereof.

9. The paper of claim 3 wherein the amount of the dye added to the paper is 0.001 to 1 percent by weight of the pulp.

10. The paper of claim 4 wherein the amount of dye is a small amount effective to enhance the whiteness of paper.

11. The paper of claim 3 wherein the amount of pigment is in the range of about 1 to 10 percent by weight of the pulp and the amount of dye is in the range of about 0.001 to 1 percent by weight of the pulp.

12. The paper of claim 6 wherein the amount of pigment is in the range of about 1 to 10 percent by weight of the pulp and the amount of the dye is in the range of about 0.001 to 1 percent by weight of the pulp.

13. The paper of claim 3 wherein the pigment is sodium aluminum silicate.

References Cited in the file of this patent

UNITED STATES PATENTS

| | | |
|---|---|---|
| 277,383 | Trotter | May 8, 1883 |
| 2,204,113 | Allen | June 11, 1940 |
| 2,237,374 | Smith | Apr. 8, 1941 |
| 2,340,728 | Baker | Feb. 1, 1944 |
| 2,458,104 | Schweizer | Jan. 4, 1949 |
| 2,599,094 | Craig | Jan. 3, 1952 |
| 2,668,777 | Gold et al. | Feb. 9, 1954 |
| 2,694,064 | Hausermann | Nov. 9, 1954 |
| 2,694,633 | Pattilloch | Nov. 16, 1954 |
| 2,702,759 | Scalera | Feb. 22, 1955 |
| 2,713,055 | Baum | July 12, 1955 |
| 2,734,830 | Hagge et al. | Feb. 14, 1956 |

OTHER REFERENCES

"The Use of Optical Brighteners In the Paper Industry," by A. E. Siegrist, Das Papier, 8, No. 7/8, pp. 109–20 (April 1954).